United States Patent
Yaffe (10) Patent No.: US 9,365,255 B1
(45) Date of Patent: Jun. 14, 2016

(54) METHOD AND APPARATUS FOR RAKING A MOTORCYCLE FRAME

(76) Inventor: Paul Yaffe, Phoenix, AZ (US)

( * ) Notice: Subject to any disclaimer, the term of this patent is extended or adjusted under 35 U.S.C. 154(b) by 394 days.

(21) Appl. No.: 13/192,013

(22) Filed: Jul. 27, 2011

Related U.S. Application Data (60) Provisional application No. 61/459,147, filed on Dec. 7, 2010.

(51) Int. Cl.
| | |
|---|---|
| *B62K 11/02* | (2006.01) |
| *B62K 19/00* | (2006.01) |
| *B62K 11/04* | (2006.01) |
| *B62K 19/02* | (2006.01) |
| *B62K 19/18* | (2006.01) |

(52) U.S. Cl.
CPC .............. *B62K 19/00* (2013.01); *B62K 11/02* (2013.01); *B62K 11/04* (2013.01); *B62K 19/02* (2013.01); *B62K 19/18* (2013.01)

(58) Field of Classification Search
USPC ................. 180/219; 280/276, 277, 279, 280
See application file for complete search history.

(56) References Cited

U.S. PATENT DOCUMENTS

| | | | |
|---|---|---|---|
| 3,866,946 A | 2/1975 | Robison | |
| 4,082,307 A | 4/1978 | Tait | |
| 4,565,382 A | 1/1986 | Sherman | |
| 4,579,190 A * | 4/1986 | Hashimoto et al. | 180/227 |
| 4,600,207 A * | 7/1986 | Zosi | B62K 11/04 280/276 |
| 4,624,470 A * | 11/1986 | Love | 280/279 |
| 5,938,092 A * | 8/1999 | Johnson | 224/521 |
| 5,967,538 A | 10/1999 | Callaluca et al. | |
| 7,111,861 B2 | 9/2006 | Pender | |
| 7,438,306 B2 | 10/2008 | Mrdeza et al. | |
| 7,537,230 B1 * | 5/2009 | Gorvine et al. | 280/281.1 |
| 7,637,521 B2 * | 12/2009 | Grant | B62K 13/00 280/276 |
| 7,938,422 B2 * | 5/2011 | Clari | B62K 21/22 280/279 |
| 8,181,981 B2 * | 5/2012 | Stenberg | 280/281.1 |
| 8,225,897 B1 * | 7/2012 | Hollingsworth | 180/219 |
| 8,414,007 B2 * | 4/2013 | Chen | B62K 9/00 280/278 |
| 8,789,640 B2 * | 7/2014 | Matsuda | B62K 11/06 180/206.1 |
| 9,162,726 B2 * | 10/2015 | Takenaka | B62K 21/10 |
| 9,211,933 B2 * | 12/2015 | Lee | B62K 21/22 |
| 2006/0060405 A1 * | 3/2006 | Pender | 180/219 |
| 2009/0212529 A1 * | 8/2009 | Stenberg | 280/287 |
| 2013/0180792 A1 * | 7/2013 | Toftner | 180/219 |

* cited by examiner

*Primary Examiner* — Joseph Rocca
*Assistant Examiner* — Marc A Scharich
(74) *Attorney, Agent, or Firm* — Ice Miller LLP (57) ABSTRACT

The present invention is directed to an apparatus for, and method of, raking a motorcycle, and to a motorcycle with a raked frame.

16 Claims, 10 Drawing Sheets

METHOD AND APPARATUS FOR RAKING A MOTORCYCLE FRAME

RELATED APPLICATION DATA

This application claims the priority benefit of U.S. Provisional Application Ser. No. 61/459,147, filed Dec. 7, 2010, which is hereby incorporated in its entirety herein by reference.

FIELD OF THE INVENTION

The present invention relates to an apparatus and method of raking a motorcycle. The present invention also relates to a motorcycle with a raked frame.

BACKGROUND OF THE INVENTION

The steering and stability characteristics of motorcycles, bicycles and other similar types of vehicles can be varied and altered in a number of different ways. Altering the front wheel assembly rake and trail angles can change the steering and stability characteristics of a motorcycle. The rake angle is defined as the angle which the steering axis of the front wheel assembly of the motorcycle (often called the "neck" of the motorcycle frame) has relative to an imaginary vertical axis or plane. Thus, if an imaginary vertical plane is passed through the steering head assembly of a motorcycle, the rake angle is that angle formed between such plane and steering axis of the front wheel assembly. The horizontal distance of the forward wheel's axle from a pre-defined measure is generally referred to as a motorcycle's trail. The trail can also be described as the distance defined by a vertical line from the axle of the front tire to the ground and the intersect of the line extending through the steering axis and the ground.

Variations in the rake and trail angle of a motorcycle will provide different ride and steering characteristics. Motorcycle riders and builders often extend the rake angle to obtain a desired look and desired performance. Motorcycle rake and trail angles are precise measurements that depend greatly on, and are impacted by, the size of the front wheel of the motorcycle. Thus, if a rider or builder desires to change the size of the front wheel, it is often necessary or desirable to also alter the rake angle of the motorcycle to achieve the desired level of performance, stability, and safety. Various methods may be employed to extend the rake angle, ranging from permanent modifications to the motorcycle frame, to raked triple trees, to adjustable kits.

Various methods of adjusting the front assembly of a motorcycle, including extending the fork angle are disclosed in U.S. Pat. Nos. 3,866,946, 4,082,307, 5,967,538, 4,565,382, 7,111,861, and 7,438,306.

While these kits allow for adjustment of the fork rake associated with a motorcycle, there is a need for a simple apparatus and method that can easily, reliably, accurately, and permanently be applied to a stock motorcycle to obtain a desired altered rake angle.

SUMMARY OF THE INVENTION

The embodiments of the invention and the method described herein address the shortcomings of the prior art. In general terms, the invention may be described as including the following:

The present invention provides a motorcycle rake apparatus comprising: an adapter block, having a front end and a rear end and which is (a) configured to extend the neck of a motorcycle having a front fork assembly and frame, typically through its insertion into the respective hollow portions of a motorcycle frame that has been cut and separated; (b) the front end adapted to connect to the front fork assembly of the motorcycle; and (c) the rear end adapted to connect to the frame of the motorcycle.

In one embodiment of the present invention, the adapter block has a first portion having a longitudinal axis and a second portion having a longitudinal axis wherein the longitudinal axis of the first portion and the longitudinal axis of the second portion are disposed at an angle at least three to at least fifteen degrees to one another.

In another embodiment of the present invention, the front end of the adapter block is adapted to interface with to the front fork assembly of the motorcycle and the rear end of the adapter block is adapted to interface with the rear frame assembly of the motorcycle.

The front and rear ends of the adapter block may be adapted to interface with the front fork assembly and the rear frame assembly by inserting into the hollow portions of a front fork assembly and rear frame assembly. In one embodiment, the adapter block is adapted to interface with the front fork assembly and rear frame assembly through an interference fit.

The present invention also provides a motorcycle rake apparatus comprising: an adapter block, having a front end and a rear end and which is (a) configured to extend the neck of a motorcycle, by one or more predetermined amounts, typically through its insertion into the respective hollow portions of a motorcycle frame that has been cut and separated to create a "rear frame assembly" and a "front fork assembly;" (b) the adapter block bent at an angle of at least five to at least fifteen degrees between the front end and the rear end; (c) the front end adapted to connect to the front fork assembly of the motorcycle frame; and (d) the rear end adapted to connect to the rear frame assembly of the motorcycle.

The adapter block may also be understood to have a first portion having a longitudinal axis and a second portion having a longitudinal axis of wherein the longitudinal axis of the first portion and the longitudinal axis the second portion are disposed at an angle at least three to at least fifteen degrees to one another.

The present invention further includes a motorcycle rake apparatus additionally comprising at least one fork stop or other device to prevent over rotation of the motorcycle steering assembly. In another embodiment, the motorcycle rake additionally comprises a cradle rail gusset.

The present invention also includes a motorcycle having a raked neck, the motorcycle comprising: (a) a frame; (b) a front fork assembly; and (c) a motorcycle rake apparatus connecting the rear frame assembly to the front fork assembly, the motorcycle rake apparatus comprising: (i) an adapter block, having a front end and a rear end; (ii) the front end adapted to connect to the front fork assembly; (iii) the rear end adapted to connect to the rear frame assembly.

The present invention also includes an embodiment wherein the adapter block has a first portion having a longitudinal axis and a second portion having a longitudinal axis wherein the longitudinal axis of the first portion and the longitudinal axis of the second portion are disposed at an angle at least three to at least fifteen degrees to one another.

The motorcycle rake apparatus may be connected to the rear frame assembly and the front fork assembly by welding, bolting, adhering, or otherwise attaching in a fixed manner.

The motorcycle of the present invention may further comprise a raked triple tree assembly. The triple tree assembly may be modified using a tree rake kit, such as the Paul Yaffe's Bagger Nation Raked Triple Tree Kit 7 degree, Part #RTTK or similar product. The triple tree assembly may be a seven or nine degree tree rake kit.

The motorcycle may also comprise a nacelle adaptor, a raked nacelle for headlight position, a fender, a wheel, a progressive lowering kit to keep the frame level, and handle bars.

In one embodiment of the present invention the motorcycle further comprises spacer blocks for the slider covers on the forks of the motorcycle. In another embodiment of the present invention, the motorcycle comprises extended fork tubes, with or without a lowering kit. In another embodiment of the present invention, the motorcycle also comprises a raked faring and faring support bar. The motorcycle may also comprise a notched inner faring and reverse-rake faring bracket.

Also included in the present invention is a method of raking the neck of a motorcycle, comprising the steps of: (a) obtaining a motorcycle having front fork assembly connected to, or being part of, the motorcycle frame; (b) separating the front fork assembly from the motorcycle frame to create a rear frame assembly and a front fork assembly as separate pieces; (c) connecting a motorcycle rake apparatus to both the front fork assembly and the rear frame assembly, such that the motorcycle rake apparatus is positioned between the front fork assembly and the rear frame assembly, wherein the motorcycle rake apparatus comprises: (i) an adapter block having a front end and a rear end, (ii) the adapter block preferably bent at an predetermined angle between the front end and the rear end; (iii) the front end adapted to connect to the front fork assembly of the motorcycle; and (iv) the rear end adapted to connected to the rear frame assembly of the motorcycle.

The present invention may be practiced using an adapter block having a bend between five and fifteen degrees. Preferably, the adapter block has a bend of seven or nine degrees.

The adapter block may also be understood to have a first portion having a longitudinal axis and a second portion having a longitudinal axis wherein the longitudinal axis of the first portion and the longitudinal axis of the second portion are disposed at an angle at least three to at least fifteen degrees to one another.

It is a goal of the present invention to extend or stretch the length of the motorcycle frame (the neck of the motorcycle). It is also a goal of the present invention to maintain approximately a 6.5" positive trail.

The motorcycle may be any stock or custom built motorcycle. Preferably, the motorcycle is a Harley Davidson Touring Class Motorcycle such as a Road King, FLH Street Glide, or Road Glide having an oversized front wheel of between 23 and 32 inches. However, it is not necessary for purposes of the present invention to have an oversized wheel. The present invention may be employed for purely aesthetic reasons regardless of wheel size.

DETAILED DESCRIPTION OF THE PREFERRED EMBODIMENTS

In accordance with the foregoing summary, the following is a detailed description of the preferred embodiments of the invention, which are considered to be the best modes thereof. The preferred methods and systems herein described are not intended to be exhaustive or to limit the invention to the precise forms disclosed.

Figure 1:
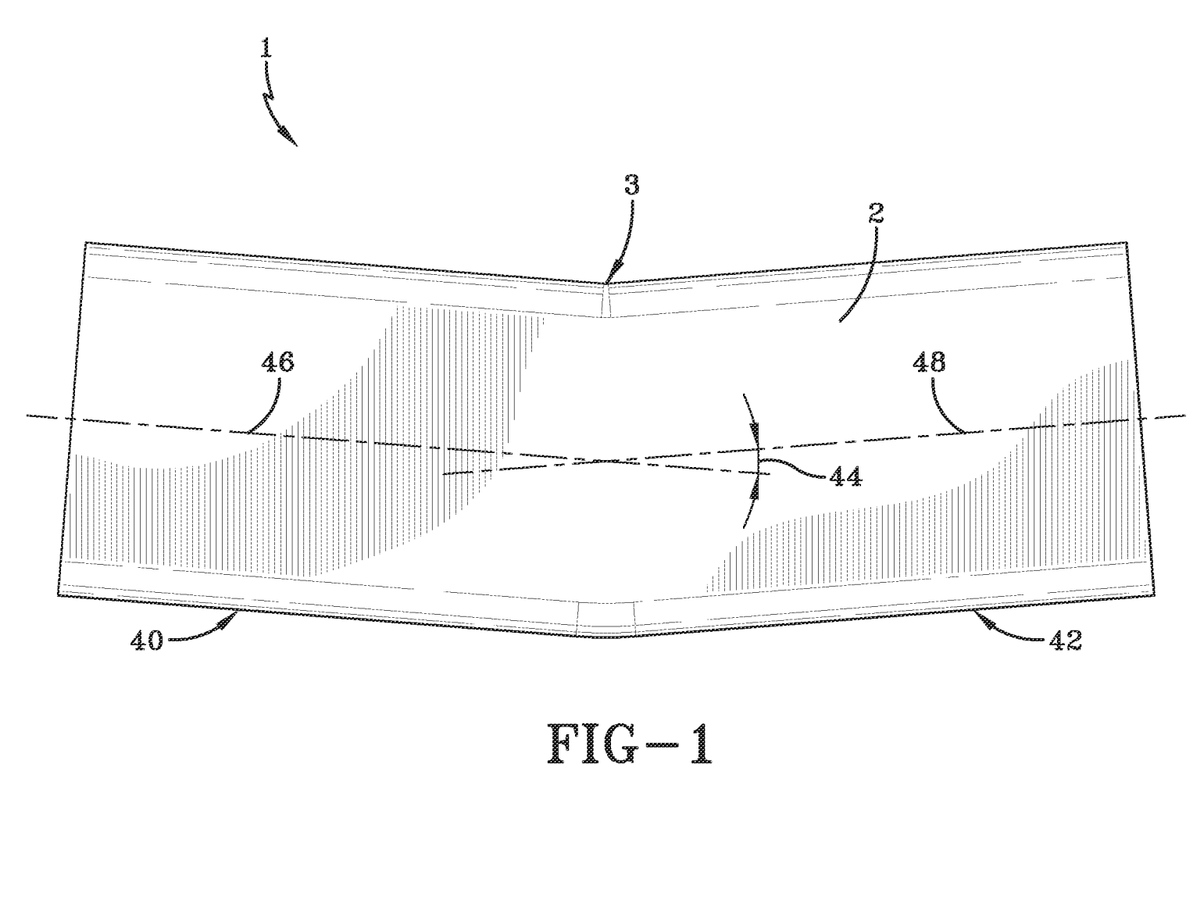
FIG. 1 is side plan view of the rake apparatus in accordance with one embodiment of the invention.

FIG. 1 is a side plan view of the rake apparatus 1 in accordance with one embodiment of the present invention. FIG. 1 shows the adapter block 2 of the apparatus. Adapter block 2 of the present invention may be made of any stable material, preferably metal, that can be cast or machined into the desired shape, including the desired length, width, height, thickness, and/or angle. More preferably, the material is 3/16 inch thick 1018 cold rolled steel. FIG. 1 also shows adapter block 2 having a rectangular shape. Preferably, adapter block 2 is a rectangular tube with an outer diameter capable of interfacing with the neck portion of a motorcycle frame. More preferably, adapter block 2 is a rectangular tube with an outer diameter that corresponds to the inner diameter of the neck portion of a motorcycle frame into which the adapter block may be inserted.

FIG. 1 also shows adapter block 2 having a bend 3 at its midpoint. Preferably, the adapter block has a seven or nine degree bend. In the preferred embodiment, the adapter block has a nine degree bend and is intended to be used to rake and stretch the neck of a motorcycle to accommodate a 26 inch front wheel. In another embodiment, the adapter block has a seven degree bend and is intended to be used to rake and stretch the neck of a motorcycle to accommodate a 23 inch front wheel. It should be appreciated that, while although in the preferred embodiment, the rake apparatus is designed to accommodate a motorcycle with a 23 or 26 inch diameter wheel, the rake apparatus may also be designed to accommodate any wheel greater than 16 inches in diameter.

Figure 2:
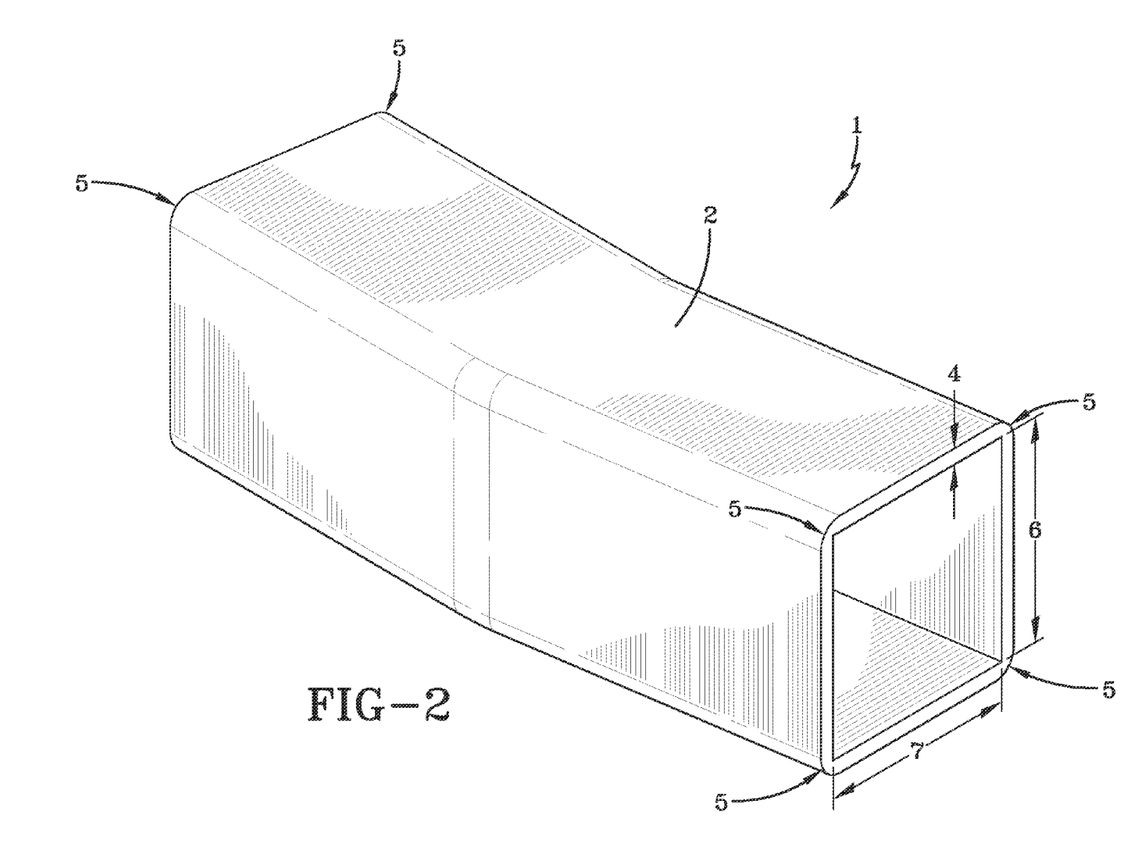
FIG. 2 is front angle perspective view of the rake apparatus in accordance with one embodiment of the invention.

FIG. 2 is a front angle perspective view of the rake apparatus 1 in accordance with one embodiment of the invention. FIG. 2 shows an adapter block 2 having a thickness 4 of 3/16 inches. FIG. 2 also shows adapter block having rounded corners 5. It is preferred that the corners of the adapter block of the present invention have rounded corners for ease of inserting the adapter block into the frame of a motorcycle, namely into the rear frame assembly and the front fork assembly of the motorcycle frame. Adapter block 1 further has a height 6 of 2 3/16 inches and a width 7 of 2 3/16 inches. In the preferred embodiment of the present invention, the height and width of the adapter block corresponds to the inner height and width of a hollow portion of the front fork assembly and the rear frame assembly of a motorcycle frame, once separated.

Figure 3:
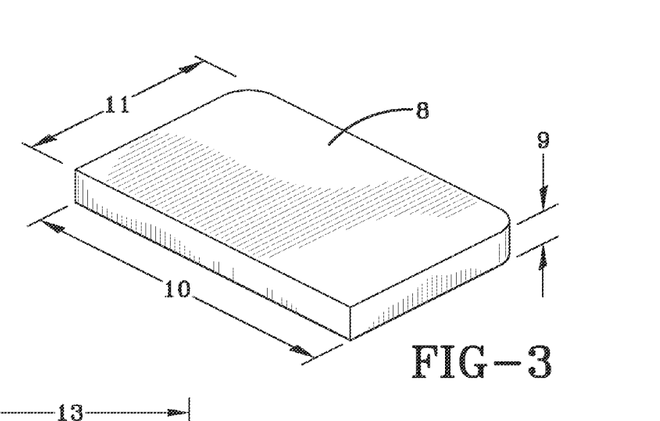
FIG. 3 is a top angle view of a cradle rail gusset member in accordance with one embodiment of the present invention.

FIG. 3 shows cradle rail gusset member 8 in accordance with one embodiment of the present invention. Cradle rail gusset member 8 has a thickness 9 of 4/16 inches, a length 10 of 2 3/8 inches, and a width 11 of 1 5/16 inches. The cradle rail gusset member may be made of any stable material, preferably metal, that can be cast or machined into the desired shape and thickness. More preferably, the material is 1018 cold rolled steel. In one embodiment of the preferred invention, the cradle rail gusset member is welded on to a motorcycle front fork assembly and rear frame assembly after the adapter block has been inserted into the frame between the motorcycle rear frame assembly and front fork assembly.

Figure 4:
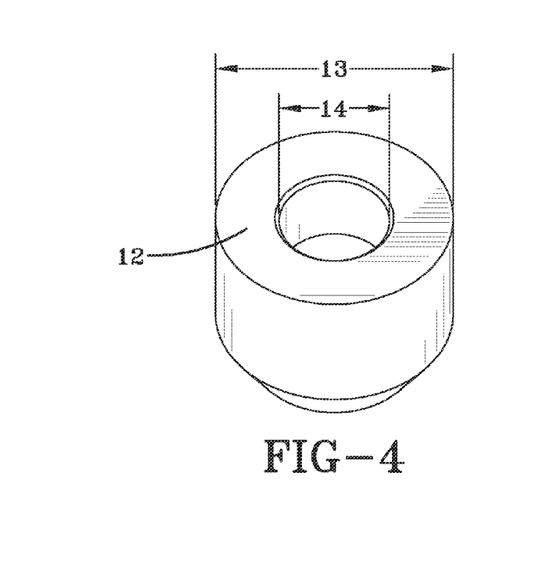
FIG. 4 is a top plan view of a fork stop member in accordance with one embodiment of the present invention.

FIG. 4 shows a fork stop member 12 in accordance with one embodiment of the present invention. Fork stop member 12 has a diameter 13 of 1 inch and an inner diameter 14 of 4/16. The fork stop member may be made of any stable material, preferably metal, that can be cast or machined into the desired shape. In the preferred embodiment, fork stop member 12 is machined from 1018 cold rolled steel.

Figure 5:
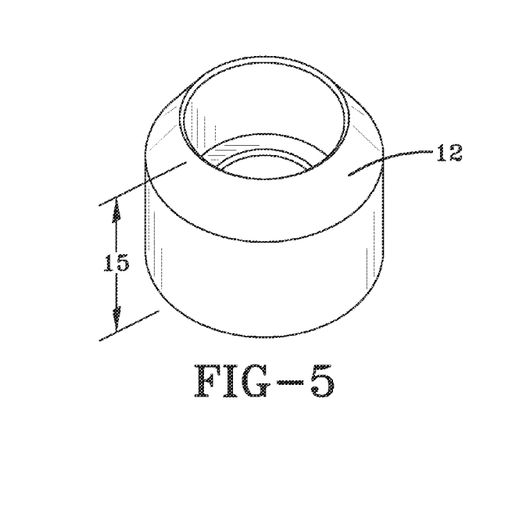
FIG. 5 is a bottom angle perspective view of a fork stop member in accordance with one embodiment of the present invention.

FIG. 5 is a top angle view of fork stop member 12. FIG. 5 shows fork stop member 12 having a height 15 of 12/16 inches. In the preferred embodiment of the present invention two fork stop members are welded on to the frame to prevent over rotation of the motorcycle steering assembly.

Figure 6:
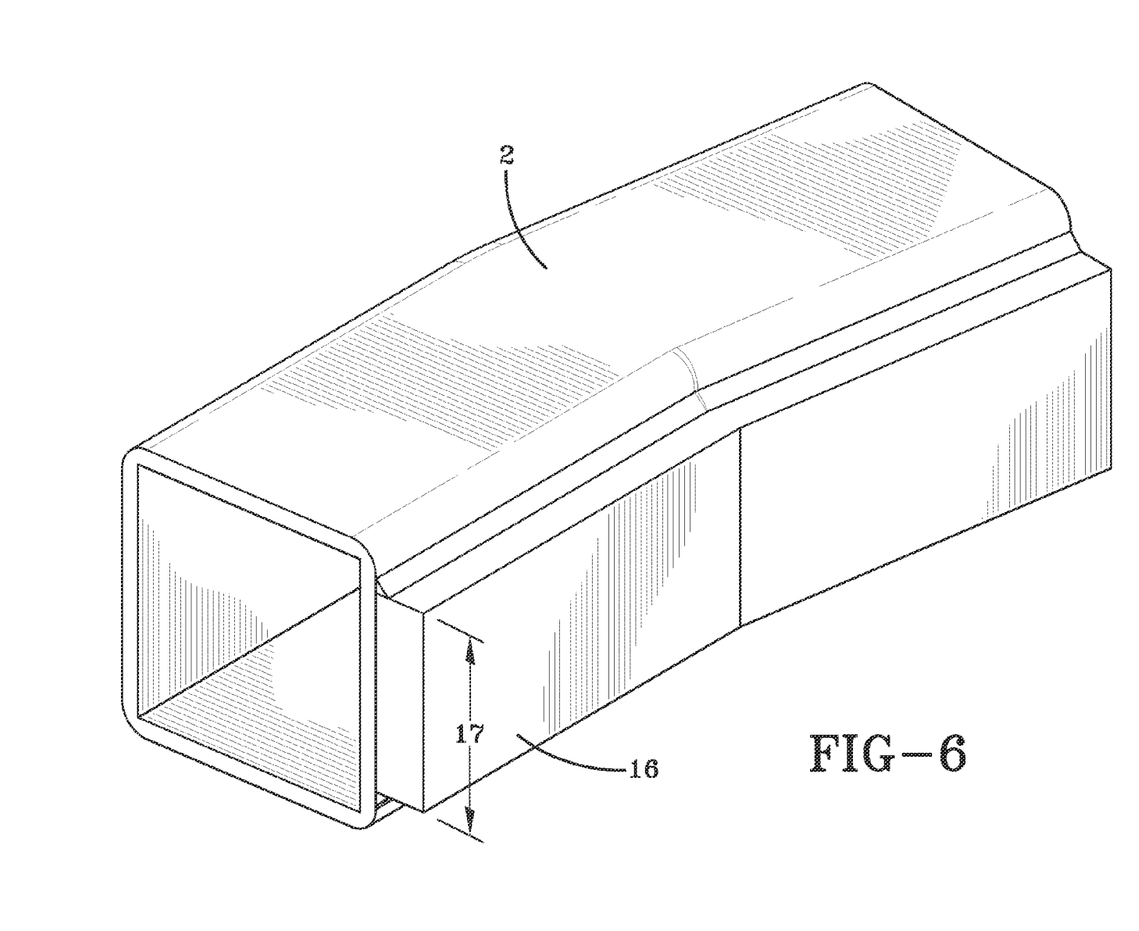
FIG. 6 is a side plan view of a rake apparatus in accordance with one embodiment of the invention.
Figure 7:
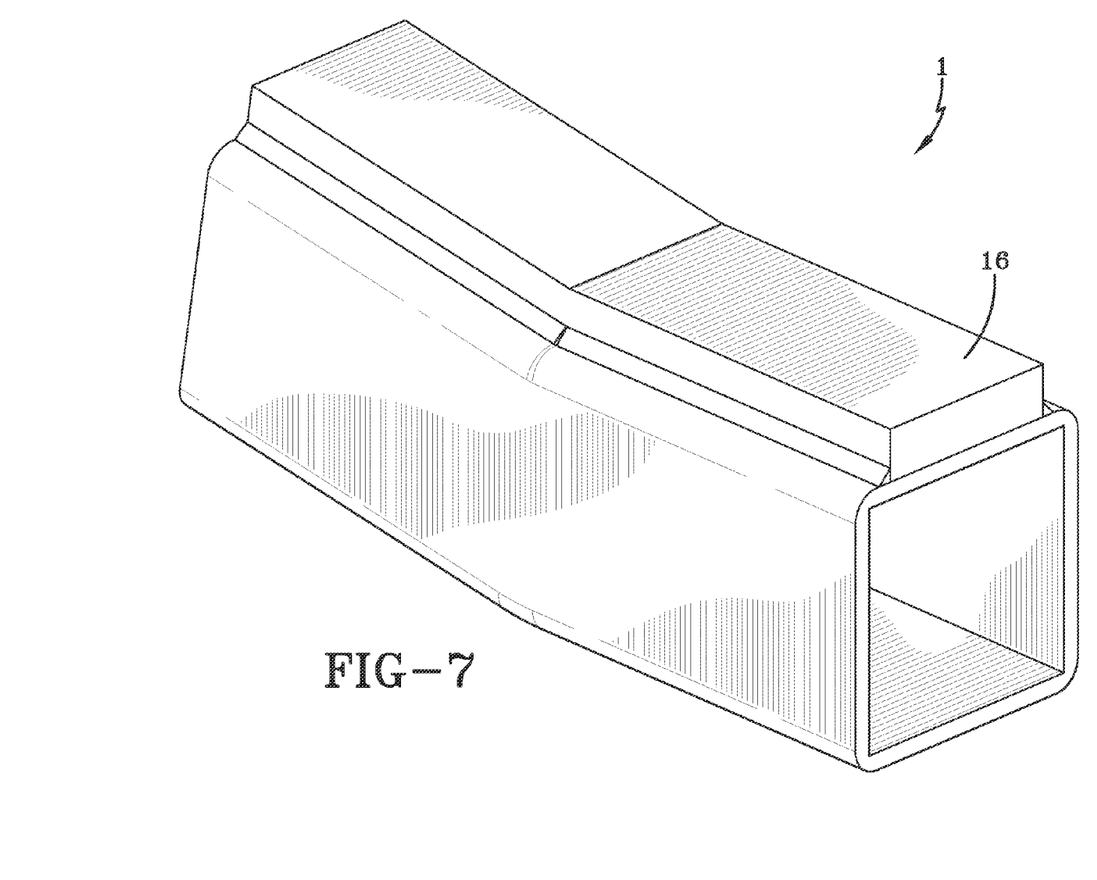
FIG. 7 is a side angle perspective view of a rake apparatus in accordance with one embodiment of the invention.

FIG. 6 shows an adapter block 2 having an alignment member 16 in accordance with one embodiment of the present invention. Alignment member 16 has a height 17 of 3/8 inches and a length equal to the length of the adapter block. FIG. 7 is a side angle perspective view of a rake apparatus 1 in accordance with one embodiment of the invention having alignment member 16.

The present invention also provides a method of raking the neck of a motorcycle. The method comprises the steps of: (a) obtaining a motorcycle having a front fork assembly connected to a the motorcycle frame separating the front fork assembly from the frame; (b) separating said front fork assembly from said frame so as to create a discrete front fork assembly and rear frame assembly, and to expose respective hollow ends of each; and (c) connecting a motorcycle rake apparatus to said front fork assembly and said rear frame assembly such that said motorcycle rake apparatus is positioned between said front fork assembly and said rear frame assembly, wherein said motorcycle rake apparatus comprises: (i) an adapter block having a front end and a rear end, (ii) the adapter block preferably bent at an angle between the front end and the rear end; (iii) the front end adapted to connect to the front fork assembly of the motorcycle; and (iv) the rear end adapted to connected to the rear frame assembly of the motorcycle.

As shown in FIG. 1, the adapter block 2 may also be understood to have a first portion 40 having a longitudinal axis 46 and a second portion 42 having a longitudinal axis 48 wherein the longitudinal axis 46 of the first portion 40 and the longitudinal axis 48 of the second portion 42 are disposed at an angle 44 at least three to at least fifteen degrees to one another.

The motorcycle front fork assembly may be separated from the frame by using a saw or other device or process to cut the frame's neck into two pieces to expose the hallow ends of the separated pieces. In the preferred embodiment of the present invention, a sawzall is used to cut at an angle parallel to the original rake angle of the front fork assembly. After the rear frame assembly and front fork assembly are separated, plug holes are drilled into the sides of the frame to provide welding points for the adapter block. The adapter block is inserted into the rear frame assembly and the front fork assembly portion is attached by inserting the front end of the adapter block into the front fork assembly portion. As shown generally in FIG. 9, in the preferred embodiment of the present invention, the adapter block 20 provides a raked neck 34 for a motorcycle 30 to accommodate a front wheel 26 having a 23 inch or 26 inch diameter. For 23 inch wheels, the adapter block 20 extends the neck 34 of the motorcycle 30 and, therefore, the length 24 of the motorcycle 30, by 3/4 inches and increases the rake angle 22 of the neck 34 by 7 degrees. For 26 inch wheels the adapter block 30 extends the neck 34 of the motorcycle 30 and, therefore, the length 24 of the motorcycle 30, by 1 inch and increases the rake angle 22 of the neck 34 by 9 degrees.

Figure 9:
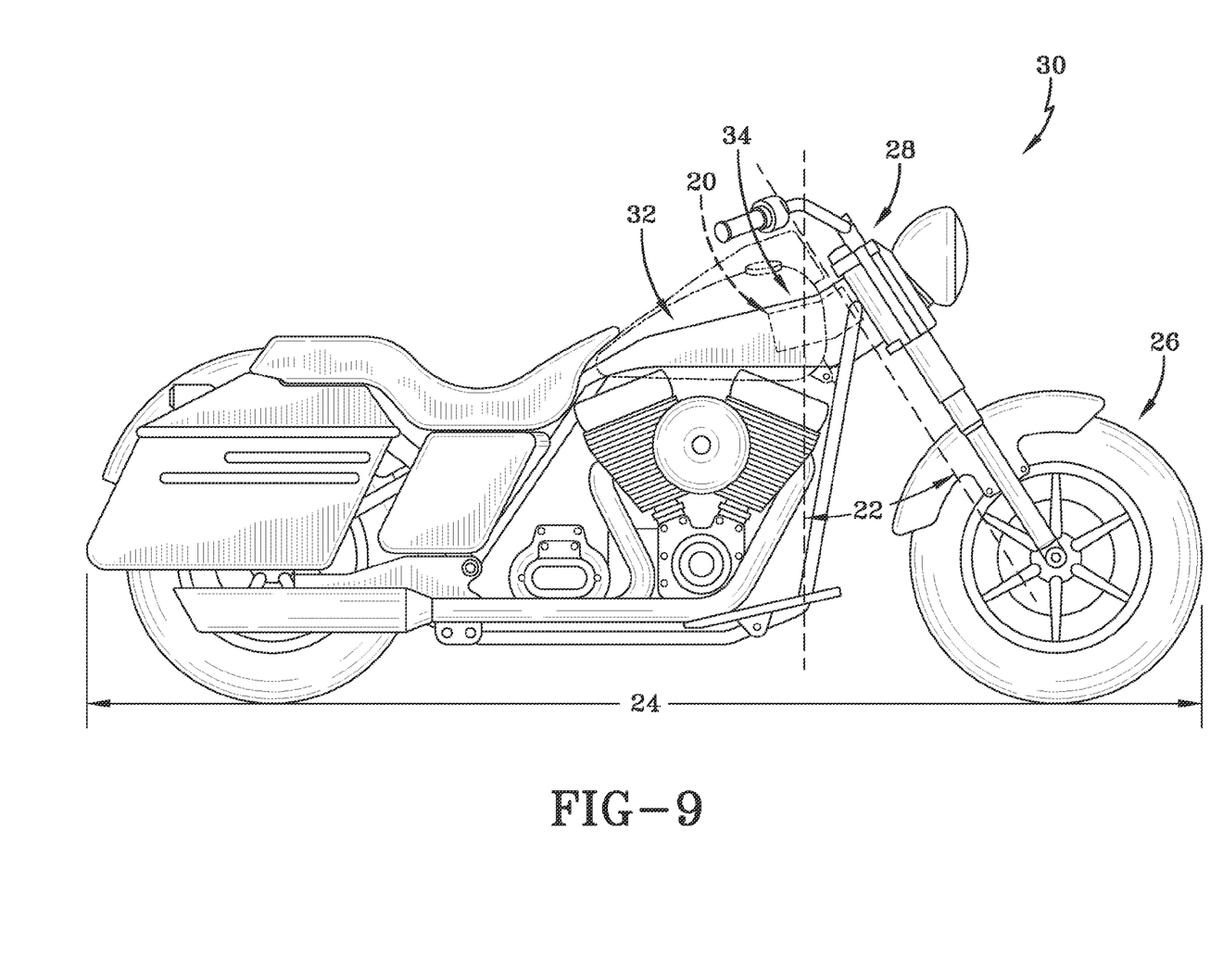
FIG. 9 shows a motorcycle in accordance with an embodiment of the present invention.

The adapter block 20 is then welded to the front assembly portion and the frame. Preferably, as generally shown in FIG. 9, the adapter block 20 is welded by welding the adapter block 20 to the rear frame assembly 32 and the front fork assembly 28 at the points where the adapter block 20 emerges from the rear frame assembly 32 and the front fork assembly 28. The adapter block 20 is further welded to the frame by welding the plug holes previously drilled into the sides of the rear frame assembly 32 and the front fork assembly 28. A gusset plate 8, as shown in FIG. 3, may be welded to the frame below the adapter block 20 to close portions of the rear frame assembly 32 that are not covered by the adapter block 20.

The method of raking the neck of a motorcycle may further comprise the steps of welding sheet metal to the motorcycle rear frame assembly and front fork assembly to cover gaps created by extending the neck. Additionally, the method may include the steps of grinding the welding and painting the frame for aesthetic enhancement.

Figure 8:
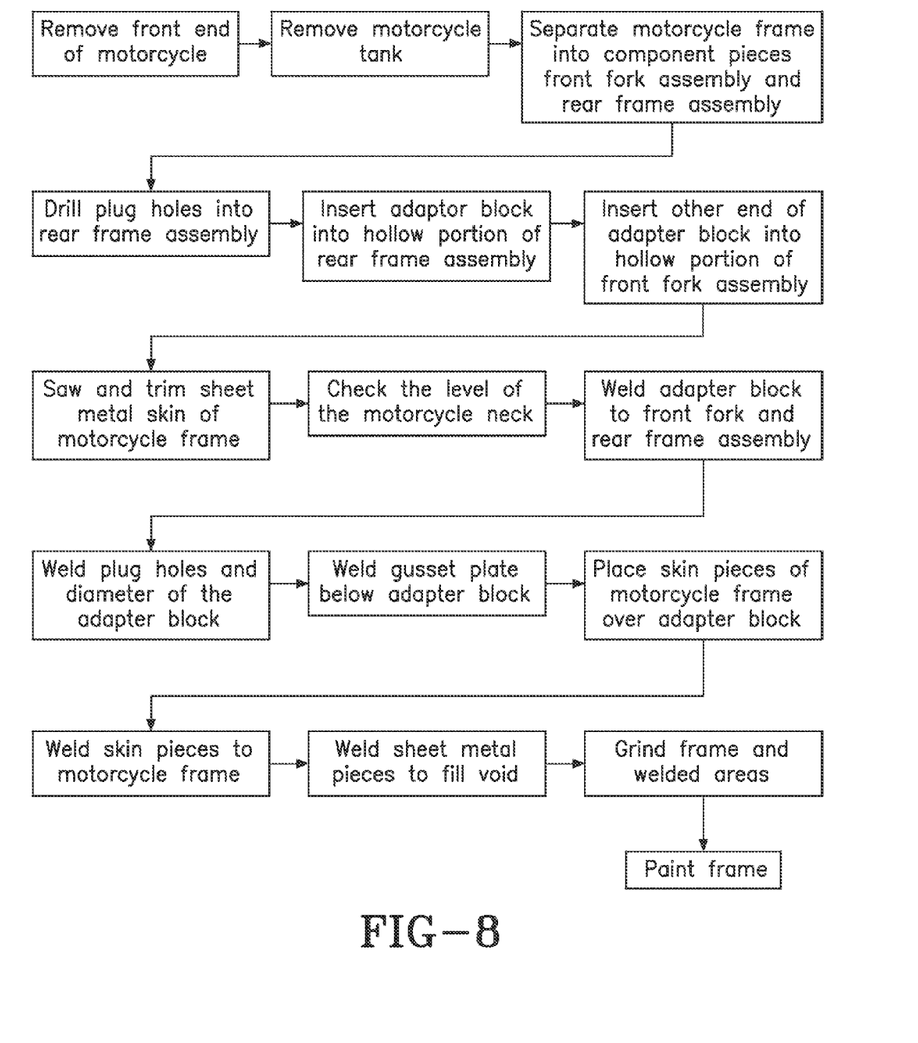
FIG. 8 shows the steps of the method of raking a neck of a motorcycle in accordance with one embodiment of the method of the present invention.

FIG. 8 shows the steps of a method accordance with one embodiment of the present invention. FIG. 8 shows the step of removal of the front end of a motorcycle and the removal of the motorcycle's tank. FIG. 8 further shows the step of the motorcycle frame being separated into component pieces front fork assembly and rear frame assembly by sawing. The motorcycle frame may be separated by any means that allows one to separate the pieces; however it is preferred to use a sawzall. A hollow portion of the rear frame assembly is revealed after it has been separated from the front fork assembly.

FIG. 8 further shows the step of plug holes drilled into the rear frame assembly. Next, the adapter block is inserted into the hollow portion of the rear frame assembly and into the hollow portion of the front fork assembly. FIG. 8 also shows the step of sheet metal skin of the motorcycle frame sawed and trimmed. The sheet metal skin may be trimmed and cut in any manner; however, it is preferred to use a cut off wheel. During the method of the present invention, the chassis should be supported and checked for a level neck and frame.

FIG. 8 shows the step of the adapter block welded to the front fork and rear frame assemblies. Next, the plug holes are welded and the entire outer diameter of the adapter block is welded at the insertion points for both the front fork and rear frame assemblies. FIG. 8 shows the step of the gusset plate welded below the adapter block to improve stability and enhance the aesthetic appearance of the raked motorcycle neck. In another embodiment, additional gusset members may be inserted into any voids between the adapter block and the motorcycle frame to improve stability.

FIG. 8 additionally shows the step of skin pieces of the motorcycle frame placed on the adapter block and slid into proper position. Next, an embodiment of a method of the present invention includes welding pieces to fill the void created in the motorcycle frame by the adapter block. FIG. 8 also shows the step of the neck of the motorcycle frame after installation of the adapter block being welded, grinded, and painted.

Figure 10:
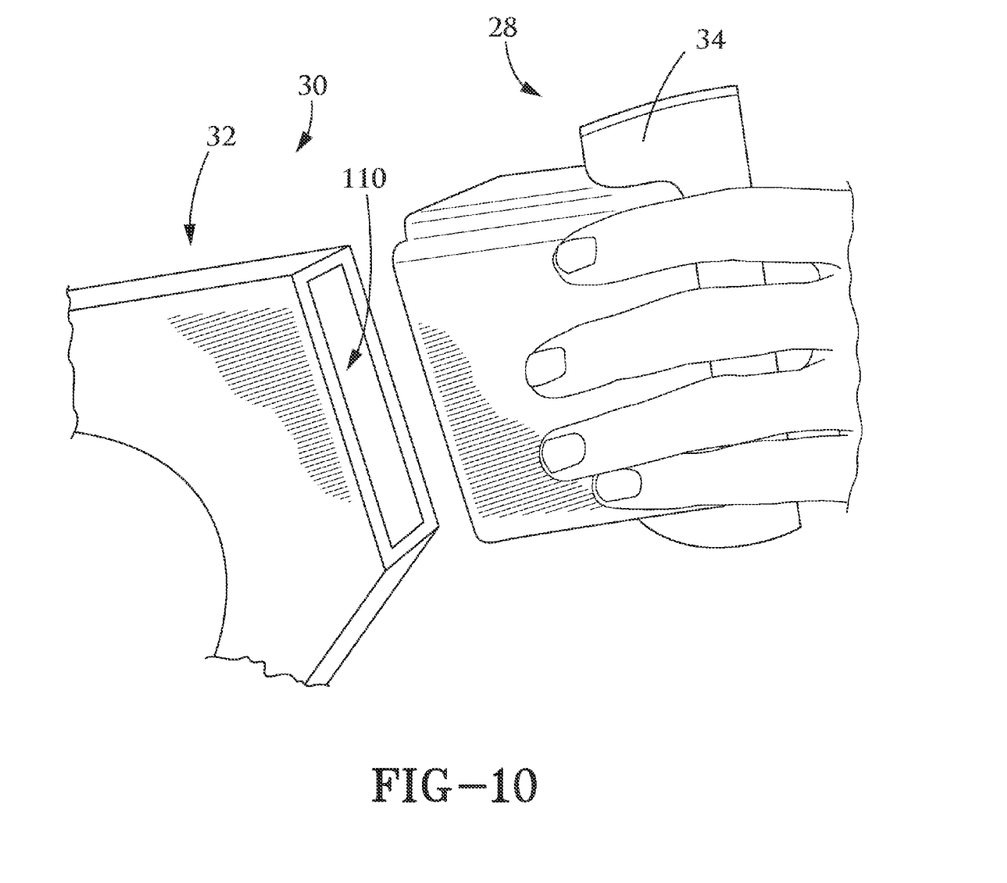
FIG. 10 shows separation of a front fork assembly and a rear frame assembly in accordance with an embodiment of the present invention.

FIG. 10 shows the removal of the front end of the motorcycle 30. FIG. 10 further shows the motorcycle frame being separated into component pieces front fork assembly 28 and rear frame assembly 32 by sawing. The motorcycle frame may be separated by any means that allows one to separate the pieces. FIG. 10 further shows the hollow portion 110 of the rear frame assembly 32 after it has been separated from the front fork assembly 28.

Figure 11:
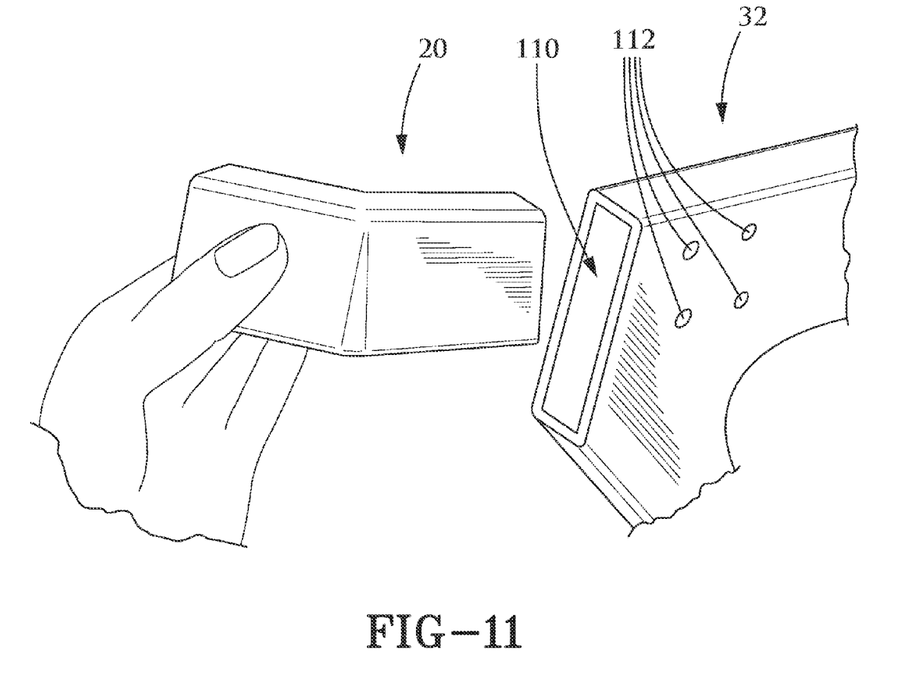
FIG. 11 shows an adapter block and a hollow portion of the rear frame assembly in accordance with an embodiment of the present invention.
Figure 12:
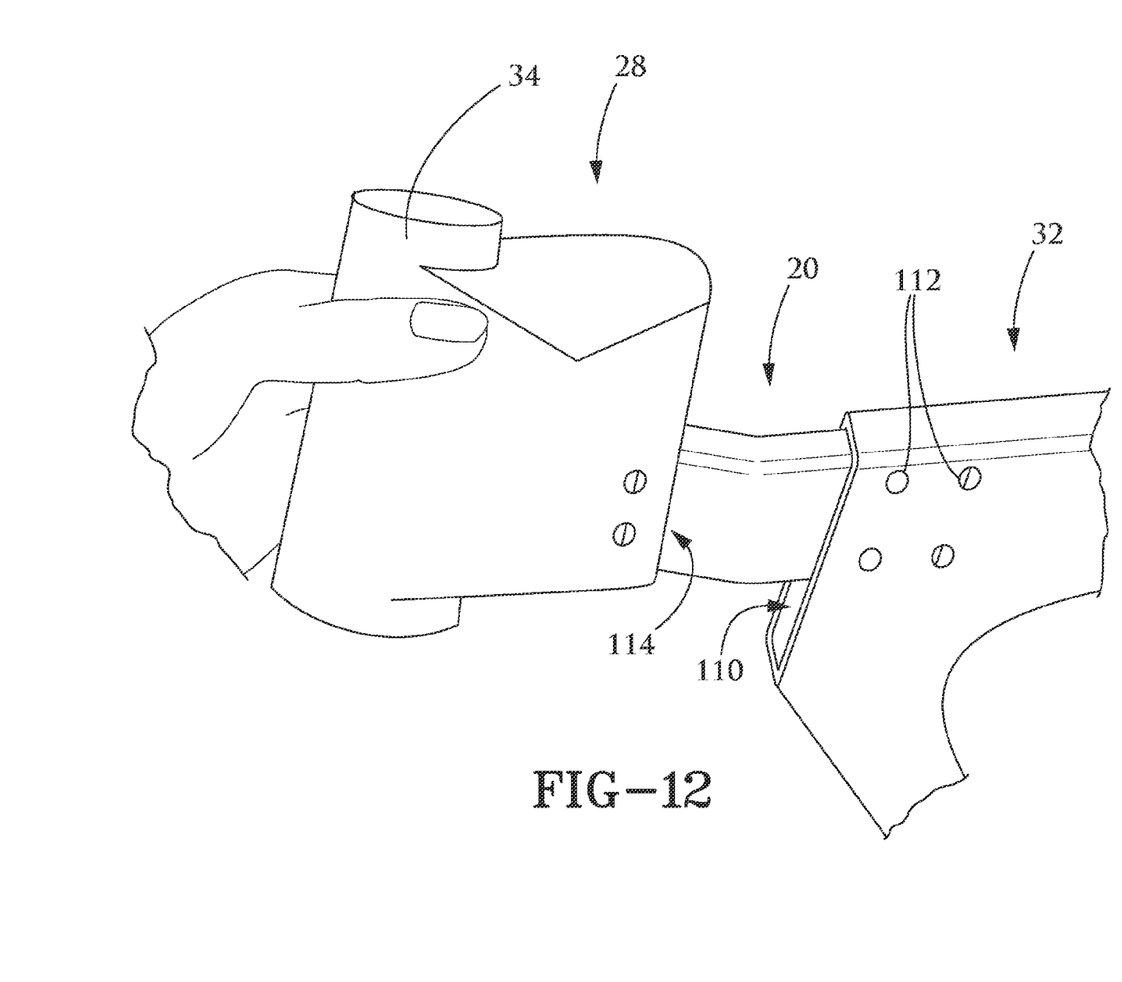
FIG. 12 shows an adapter block inserted into a hollow portion of the rear frame assembly and inserted into a hollow portion of the front fork assembly in accordance with an embodiment of the present invention.

FIG. 11 shows plug holes 112 drilled into the rear frame assembly 32. FIG. 11 further shows the adapter block 20. FIG. 12 shows the adapter block 20 inserted into the hollow portion 110 of the rear frame assembly 32 and the adapter block 20 inserted into the hollow portion 114 of the front fork assembly 28.

While the invention has been described with a certain degree of particularity, it is manifest that many changes may be made in the details of construction and the arrangement of components without departing from the spirit and scope of this disclosure. It is understood that the invention is not limited to the embodiments set forth herein for the purposes of exemplification, but is to be limited only by the scope of the attached claims, including the full range of equivalency to which each element thereof is entitled.

What is claimed is:

1. A motorcycle, having a raked neck, comprising:
   a. a rear frame assembly;
   b. a front fork assembly; and
   c. a motorcycle rake apparatus connecting said rear frame assembly to said front fork assembly, said motorcycle rake apparatus comprising:
      (1) an adapter block, having
         1. a front end having a first portion extending along a first longitudinal axis, the front end having a rectangular cross section; and
         2. a rear end having a second portion extending along a second longitudinal axis, the rear end having a rectangular cross section, and wherein said first longitudinal axis of said first portion and said second longitudinal axis of said second portion are disposed at an angle of three to fifteen degrees relative to one another;
      (2) said first portion of said front end adapted to interface into a rectangular hollow portion of said front fork assembly along said first longitudinal axis such that a height and a width of the rectangular cross section at the front end corresponds with a height and a width of the rectangular hollow portion of the front fork assembly; and
      (3) said second portion of said rear end adapted to interface into a rectangular hollow portion of said rear frame assembly along said second longitudinal axis such that a height and a width of the rectangular cross section at the rear end corresponds with a height and a width of the rectangular hollow portion of the rear frame assembly.

2. The motorcycle of claim 1 wherein said motorcycle rake apparatus is configured such that said raked neck comprises a rake angle of 7.5 degrees.

3. The motorcycle of claim 1 wherein said motorcycle rake apparatus is configured such that said raked neck comprises a rake angle of 9.5 degrees.

4. The motorcycle of claim 1 wherein said motorcycle further comprises a wheel having a diameter greater than 16 inches.

5. The motorcycle of claim 1 wherein said motorcycle further comprises a wheel having a 23 inch diameter.

6. The motorcycle of claim 1 wherein said motorcycle further comprises a wheel having a 26 inch diameter.

7. The motorcycle of claim 1, wherein the height and the width of the rectangular hollow portion of the rear frame assembly and the height and the width of the rectangular hollow portion of the front fork assembly are equal.

8. A motorcycle, having a raked neck, comprising:
   a. a rear frame assembly;
   b. a front fork assembly having a neck portion; and
   c. a motorcycle rake apparatus connecting said rear frame assembly to said front fork assembly, said motorcycle rake apparatus comprising:
      (1) an adapter block, having
         1. a front end connected to said front fork assembly such that said neck portion accepts said front end therein to fix said neck portion along a first longitudinal axis, the front end having a rectangular cross section; and
         2. a rear end extending along a second longitudinal axis, the rear end having a rectangular cross section, and wherein said first longitudinal axis of said neck portion and said second longitudinal axis are disposed at an angle of three to fifteen degrees relative to one another;
      (2) said front end adapted to interface into a rectangular hollow portion of said front fork assembly along said first longitudinal axis such that a height and a width of the rectangular cross section at the front end corresponds with a height and a width of the rectangular hollow portion of the front fork assembly; and
      (3) said rear end adapted to interface into a rectangular hollow portion of said rear frame assembly along said second longitudinal axis such that a height and a width of the rectangular cross section at the rear end corresponds with a height and a width of the rectangular hollow portion of the rear frame assembly.

9. The motorcycle of claim 8 wherein said motorcycle rake apparatus is configured such that said raked neck comprises a rake angle of 7.5 degrees.

10. The motorcycle of claim 8 wherein said motorcycle rake apparatus is configured such that said raked neck comprises a rake angle of 9.5 degrees.

11. The motorcycle of claim 8 wherein said motorcycle further comprises a wheel having a diameter greater than 16 inches.

12. The motorcycle of claim 8 wherein said motorcycle further comprises a wheel having a 23-inch diameter.

13. The motorcycle of claim 8 wherein said motorcycle further comprises a wheel having a 26-inch diameter.

14. The motorcycle of claim 8 wherein said motorcycle further comprises a wheel having a 30-inch diameter.

15. The motorcycle of claim 8 wherein said motorcycle further comprises a wheel having a 32-inch diameter.

16. A motorcycle comprising:
   a. a rear frame assembly;
   b. a front fork assembly having a neck portion; and
   c. an adapter block, having
      (1) a front end extending in a forward direction along a first longitudinal axis and into said front fork assembly such that said neck portion accepts said front end therein to fix said neck portion along said first longitudinal axis, the front end having a rectangular cross section; and (2) a rear end extending in a rearward direction along a second longitudinal axis, the rear end having a rectangular cross section, and wherein said first longitudinal axis and said second longitudinal axis are disposed at an angle of three to fifteen degrees relative to one another; wherein:

said front end is adapted to interface into a rectangular hollow portion of said front fork assembly along said first longitudinal axis such that a height and a width of the rectangular cross section at the front end corresponds with a height and a width of the rectangular hollow portion of the front fork assembly; and said rear end is adapted to interface into a rectangular hollow portion of said rear frame assembly along said second longitudinal axis such that a height and a width of the rectangular cross section at the rear end corresponds with a height and a width of the rectangular hollow portion of the rear frame assembly.

* * * * *